US012146461B2

(12) United States Patent
Ramprashad et al.

(10) Patent No.: US 12,146,461 B2
(45) Date of Patent: Nov. 19, 2024

(54) DUAL VALVE FUEL METERING SYSTEMS

(71) Applicant: Hamilton Sundstrand Corporation, Charlotte, NC (US)

(72) Inventors: Sachin Ramprashad, West Hartford, CT (US); Todd Haugsjaahabink, Springfield, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/827,344

(22) Filed: May 27, 2022

(65) Prior Publication Data

US 2023/0383715 A1 Nov. 30, 2023

(51) Int. Cl.
*F02M 59/20* (2006.01)
*F02D 41/30* (2006.01)
*F02M 59/46* (2006.01)

(52) U.S. Cl.
CPC ......... *F02M 59/20* (2013.01); *F02D 41/3005* (2013.01); *F02M 59/462* (2013.01); *F02M 59/466* (2013.01)

(58) Field of Classification Search
CPC .... F02C 9/28; F02C 9/263; F02C 3/20; F02C 7/232
See application file for complete search history.

(56) References Cited

U.S. PATENT DOCUMENTS

| | | | | |
|---|---|---|---|---|
| 3,618,777 | A * | 11/1971 | Meyer | B67D 7/08 210/90 |
| 5,339,636 | A | 8/1994 | Donnelly et al. | |
| 5,448,882 | A | 9/1995 | Dyer et al. | |
| 5,809,771 | A * | 9/1998 | Wernberg | F02C 7/228 60/39.094 |
| 6,381,946 | B1 | 5/2002 | Wernberg et al. | |
| 6,487,847 | B1 * | 12/2002 | Snow | F02K 3/10 60/764 |
| 6,637,199 | B2 | 10/2003 | Spickard | |
| 6,898,939 | B2 | 5/2005 | Busch | |
| 8,893,466 | B2 | 11/2014 | Reuter | |
| 10,451,053 | B2 | 10/2019 | Nyzen et al. | |
| 10,968,832 | B2 | 4/2021 | Portolese et al. | |
| 2009/0114193 | A1 * | 5/2009 | Cooke | F02M 43/00 239/584 |
| 2015/0020888 | A1 * | 1/2015 | Baker | G05D 7/0664 137/12 |
| 2015/0020889 | A1 | 1/2015 | Baker | |
| 2015/0135724 | A1 * | 5/2015 | Baker | F02C 7/236 60/734 |
| 2018/0135529 | A1 * | 5/2018 | Portolese | F02C 9/263 |
| 2021/0025330 | A1 | 1/2021 | Reuter et al. | |

OTHER PUBLICATIONS

Extended European Search Report issued in Application No. 23176225.3 dated Oct. 4, 2023.

* cited by examiner

*Primary Examiner* — John Kwon
(74) *Attorney, Agent, or Firm* — Kinney & Lange, P.A.

(57) ABSTRACT

A dual valve fuel metering system comprising a flow path defined between a fuel inlet and a fuel outlet. The flow path includes a primary flow path and a secondary flow path, wherein the fuel outlet is configured and adapted to be in fluid communication with at least one engine fuel manifold. A primary flow metering valve configured and adapted to meter flow on the primary flow path. A secondary flow metering valve configured and adapted to meter flow on the secondary flow path.

17 Claims, 2 Drawing Sheets

DUAL VALVE FUEL METERING SYSTEMS

BACKGROUND OF THE INVENTION

1. Field of the Invention

The present disclosure relates to engine fuel control systems, and more particularly to dual valve metering systems for engine fuel control systems.

2. Description of Related Art

Engine fuel control systems typically include a pump upstream from fuel delivery component(s). These fuel delivery components include fuel nozzles, fuel manifolds, or the like. In order to control flow to these components, some systems include a main fuel metering valve upstream from a flow split.

The conventional techniques have been considered satisfactory for their intended purpose. However, there is a need for improved dual valve metering systems. This disclosure provides a solution for this need.

SUMMARY OF THE INVENTION

A dual valve fuel metering system comprising a flow path defined between a fuel inlet and a fuel outlet. The flow path includes a primary flow path and a secondary flow path, wherein the fuel outlet is configured and adapted to be in fluid communication with at least one engine fuel manifold. A primary flow metering valve configured and adapted to meter flow on the primary flow path. A secondary flow metering valve configured and adapted to meter flow on the secondary flow path.

In some embodiments, the system includes a primary linear variable differential transformer (LVDT) operatively connected to the primary flow metering valve. The system can include a primary electro-hydraulic servo valve (EHSV) in fluid communication with the primary flow metering valve. The primary EHSV can be configured and adapted to control a position of a piston of the primary flow metering valve.

In some embodiments, the system includes a secondary LVDT operatively connected to the secondary flow metering valve. The system can include a secondary EHSV in fluid communication with the secondary flow metering valve. The secondary EHSV can be configured and adapted to control a position of a piston of the secondary flow metering valve.

The system can include a primary pressure regulating valve in fluid communication with the primary flow metering valve. The system can include a secondary pressure regulating valve in fluid communication with the secondary flow metering valve. The system can include a servo pressure regulating valve upstream from a split between the primary flow path and the secondary flow path. The flow path can be free from valve or metering devices between the servo pressure regulating valve and the split. In some embodiments, the system includes a bypass pressure regulating valve (BPRV) in fluid communication with the primary flow metering valve. The BPRV can be configured and adapted to maintain a metering window delta pressure by bypassing any excess flow provided.

In accordance with another aspect, an engine fuel control system includes a pump, a dual valve fuel metering system, as described above, downstream from the pump. An engine is downstream from the dual valve fuel metering system. An engine computer is operatively coupled to the dual valve fuel metering system to control the dual valve fuel metering system.

The pump can be a positive displacement pump, and/or a pressure-setting pump. In some embodiments, the dual valve fuel metering system includes a primary LVDT operatively connected to the primary flow metering valve and a secondary LVDT operatively connected to the secondary flow metering valve. The engine computer can be in electrical communication with the primary LVDT to receive a position measurement of a piston of the primary flow metering valve from the primary LVDT. The engine computer can be in electrical communication with the secondary LVDT to receive a position measurement of a piston of the secondary flow metering valve from the secondary LVDT. The primary and secondary EHSVs can be in electrical communication with the engine computer. The primary and secondary EHSVs can be in fluid communication with the primary and secondary flow metering valves. The primary EHSV can be configured and adapted to receive a command from the engine computer and to control a position of a piston of the primary flow metering valve. The secondary EHSV can be configured and adapted to receive a command from the engine computer and to control a position of a piston of the secondary flow metering valve.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
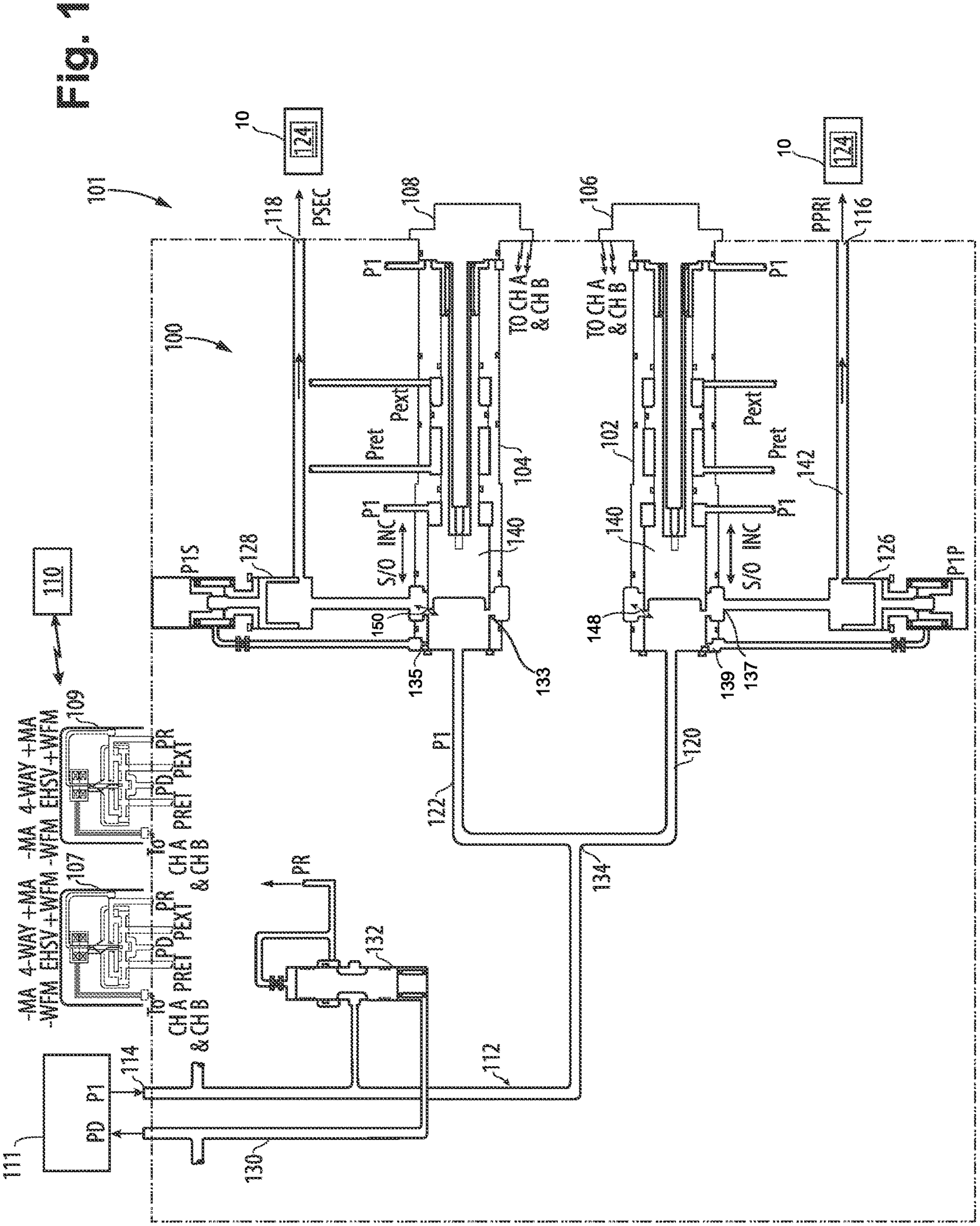
FIG. 1 is a schematic depiction of an engine fuel control system having a dual valve fuel metering system constructed in accordance with an embodiment of the present disclosure, showing primary and secondary flow paths with respective flow metering valves.

Reference will now be made to the drawings wherein like reference numerals identify similar structural features or aspects of the subject disclosure. For purposes of explanation and illustration, and not limitation, a schematic view of an exemplary embodiment of a fuel pump system having a dual valve fuel metering system in accordance with the disclosure is shown in FIG. 1 and is designated generally by reference character 100. Other embodiments of the fuel pump systems in accordance with the disclosure, or aspects thereof, are provided in FIG. 2 as will be described. The systems and methods described herein use dual flow metering valves in parallel to allow independent control of fuel flow to engine "primary" and "secondary" fuel manifolds.

As shown in FIG. 1, an engine fuel control system 101 includes a dual valve fuel metering system 100. The engine fuel control system includes a pressure setting pump 111 upstream from the dual valve fuel metering system 100. An engine computer 110 is operatively coupled to the dual valve fuel metering system 100 to control the dual valve fuel metering system 100. The pump 111 is a positive displacement pump, and/or a pressure-setting pump and provides fuel to a fuel inlet 114 at a pressure P1. The dual valve fuel metering system 100 includes "primary" and "secondary" flow paths 120, 122 in fluid communication with engine fuel manifolds/nozzles 124. The fuel manifolds/nozzles 124 are downstream from the dual valve fuel metering system 100. The dual valve fuel metering system 100 incorporates two separate flow metering valves, primary flow metering valve 102 and secondary flow metering valve 104, that will meter flow individually in a closed-loop engine fuel control system 101. This provides an advantage over traditional systems that only have one or two modes of operation. Embodiments of the present disclosure offer a simpler architecture than traditional systems that rely on splitting components downstream of a single, main metering valve. This reduces the number of subcomponents for the fuel metering unit. It is contemplated that the dual valve fuel metering system 100 can work with different pump/supply configurations, depending on the application.

With continued reference to FIG. 1, dual valve fuel metering system 100 includes a primary EHSV 107 connected to engine computer 110. The EHSV 107 is configured and adapted to receive a command from the engine computer 110 and to control a position of a piston 140 of the primary flow metering valve 102. Dual valve fuel metering system 100 includes a secondary EHSV 109 connected to engine computer 110. The secondary EHSV 109 is configured and adapted to receive a command from the engine computer 110 and to control a position of a piston 140 of the secondary flow metering valve 104. The primary and secondary EHSVs 107 and 109 are in electrical communication with the engine computer 110. Primary EHSV 107 and secondary EHSV 109 provide position control for pistons 140 of their respective flow metering valves 102 and 104, as a result of the closed loop control logic in the engine computer 110. The dual valve fuel metering system 100 includes a flow path 112 at pressure P1 defined between a fuel inlet 114 and two fuel outlets, a primary fuel outlet 116 (pressure PPRI) and a secondary fuel outlet 118 (pressure PSEC). The flow path 112 includes primary flow path 120 and secondary flow path 122. Each fuel outlet 116 and 118 is configured and adapted to be in fluid communication with at least one fuel manifold/nozzles 124.

With continued reference to FIG. 1, primary flow metering valve 102 is configured and adapted to meter flow on the primary flow path 120 (at pressure P1) from fuel inlet 114 to primary fuel outlet 116 (at pressure PPRI). Secondary flow metering valve 104 is configured and adapted to meter flow on the secondary flow path 122. A primary pressure regulating valve (PRV) 126 is in fluid communication with the primary flow metering valve 102. The system 100 includes a secondary PRV 128 in fluid communication with the secondary flow metering valve 104. The primary and secondary PRV 126 and 128, respectively, act to keep a delta pressure value constant across pressure locations 133 and 135, and 137 and 139 of their respective valves 102, 104. The PRV 126 and 128 ensure a well-controlled flow path from the fuel inlet 114 with predictable metering accuracy. The system 100 includes a servo PRV 132 (SPRV) upstream from a split 134 between the primary flow path 120 and the secondary flow path 122. SPRV 132 is in fluid communication with flow path 112 and pressure (P1) and drain pressure (PD) through drain line 130. SPRV 132 provides a regulated pressure (PR) to the EHSVs 107 and 109. SPRV acts to maintain a constant supply pressure to the two EHSVs 107 and 109. By working with a constant pressure, the EHSV has a predictable current vs. flow gain i.e. predictable relation between engine computer output vs metering valve velocity. The flow path 112 is free from valve or metering devices between the servo PRV 132 and the split 134.

As shown in FIG. 1, system 100 includes a primary linear variable differential transformer (LVDT) 106 operatively connected to the primary flow metering valve 102. The primary LVDT 106 is operatively coupled to the engine computer 110. The primary EHSV 107 is in electrical communication with the engine computer 110. The engine computer 110 is electrically connected to the primary LVDT 106 to receive a position of a piston 140 of the primary flow metering valve 102 from the primary LVDT 106. The primary EHSV 107 is operatively connected to the engine computer 110 to receive a current signal therefrom. The current signal is configured and adapted to control a position of the piston 140 of the primary flow metering valve 102, which acts to meter flow along primary flow path 120, shown schematically by arrow 148, from fuel inlet 114 to primary fuel outlet 116. The system includes a secondary LVDT 108 operatively connected to the secondary flow metering valve 104. The secondary LVDT 108 is operatively coupled to the engine computer 110. The secondary EHSV 109 is in electrical communication with the engine computer 110. The engine computer 110 is electrically connected to the secondary LVDT 108 to receive a position of a piston 140 of the secondary flow metering valve 104 from the secondary LVDT 108. The secondary EHSV 109 is operatively connected to the engine computer 110 to receive a current signal therefrom. The current signal is configured and adapted to control a position of the piston 140 of the secondary flow metering valve 104, which acts to meter flow along secondary flow path 122, shown schematically by arrow 150, from fuel inlet 114 to secondary fuel outlet 118. Each EHSV 107, 109 is operatively connected to an engine computer 110 such that the engine computer 110 can constantly monitor the valves 102 and 104 via their respective LVDTs 106 and 108 and modulate and control the EHSVs 107, 109.

With continued reference to FIG. 1, primary EHSV 107 and secondary EHSV 109 each control the retract pressure (Pret) and the extend pressure (Pext) provided to their associated flow metering valves, primary flow metering valve 102 and secondary flow metering valve 104, respectively. Depending on the control from the EHSVs 108 and/or 109, the pistons 140 in each flow metering valve 102 and 104 are commanded to be opened (translated in the increase (INC) direction), closed (translated in the shut-off (S/O)) direction, or any point in between. The primary flow metering valve 102 and the secondary flow metering valve 104 are configured and adapted to together or each independently provide the fuel needed to a main gas generator 10 (fuel manifolds/nozzles 124 are part of the main gas generator 10) to provide the main thrust power. In this way, if one of the valves 102 or 104 is damaged, the other can take on the main gas generator requirements.

Figure 2:
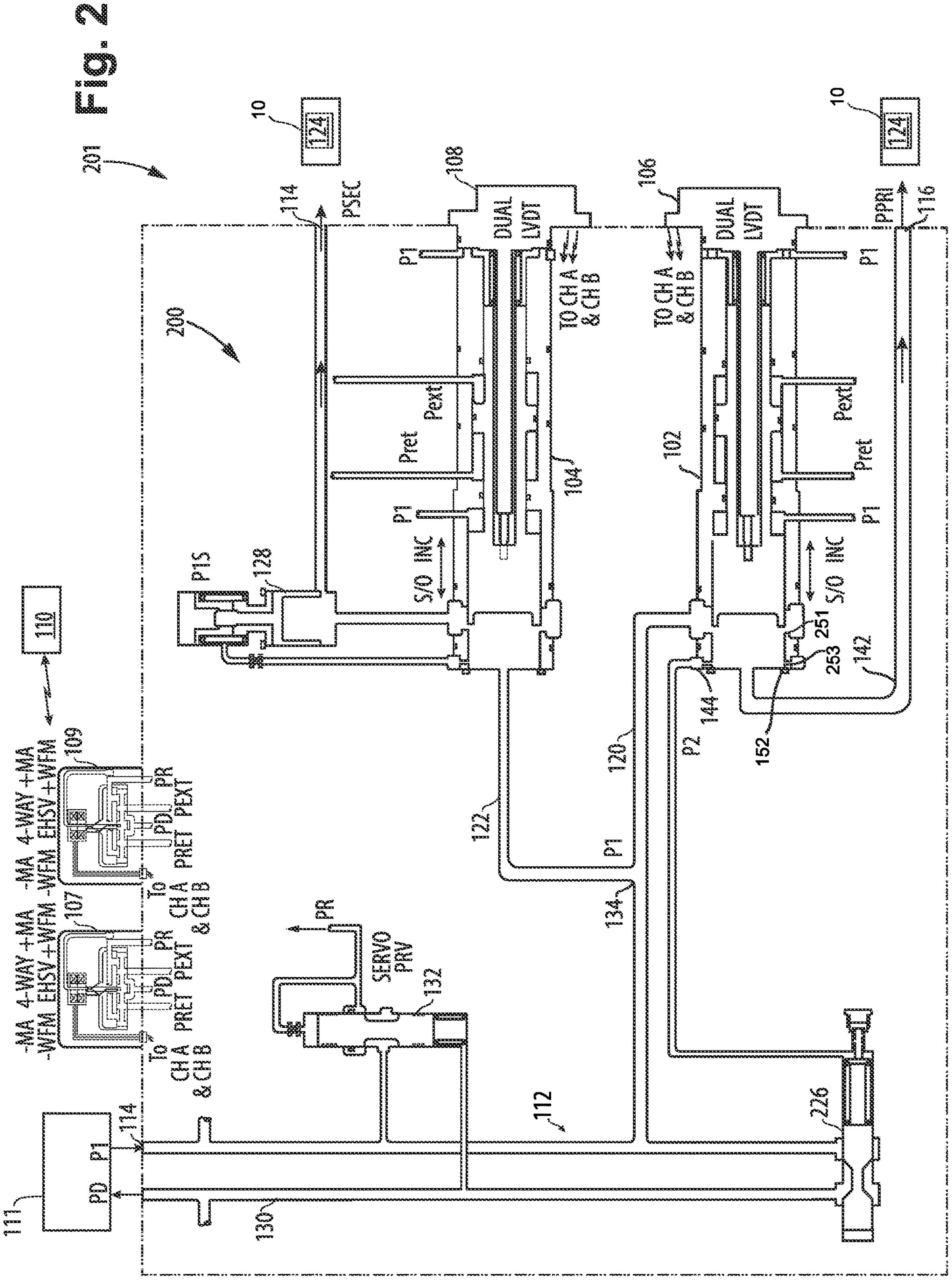
FIG. 2 is a schematic depiction of an engine fuel control system having another embodiment of a dual valve fuel metering system, showing a bypass pressure regulating valve.

As shown in FIG. 2, an engine fuel control system 201 includes a dual valve fuel metering system 200. Engine fuel control system 201 is similar to system 101. Dual valve fuel metering system 200 is similar to dual valve fuel metering system 100. System 200 includes a flow path 112 defined between a fuel inlet 114, and a primary fuel outlet 116 and secondary fuel outlet 118. Instead of the primary fuel metering valve 102 having an in-line PRV 126, system 200 includes a bypass pressure regulating valve (BPRV) 226 in fluid communication with a chamber 144 of the primary flow metering valve 102. As shown in FIG. 2, the BPRV 226 has the ability to send some of the flow out via drain line 130 in the event there is excess fluid in flow path 112. This is particularly significant for embodiments where pump 111 is a positive displacement pump, as with a positive displacement pump there is no way to control the output volume. The BPRV 226 is configured and adapted to maintain a known delta pressure across the pressure locations 251 and 253 of metering valve 102 by bypassing any excess flow provided by a pump 111, e.g. a positive displacement pump, back to drain line 130. In system 201, the BPRV 226 has pressure lines P1 and P2 located upstream of a shutoff face seal 152 of flow metering valve 102 to ensure drop-tight shutdown.

The methods and systems of the present disclosure, as described above and shown in the drawings, provide for dual valve fuel metering systems with superior properties including reduced complexity, and increased accuracy and controllability. Additionally, in the event of failure of one valve, the other can be sized to take over the functionality of both. The systems and methods of the present invention can apply to a variety of dual fuel pump systems, or the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A dual valve fuel metering system comprising:

a flow path defined between a fuel inlet and a fuel outlet, wherein the flow path includes a primary flow path and a secondary flow path, wherein the fuel outlet is configured and adapted to be in fluid communication with at least one engine fuel manifold;

a primary flow metering valve configured and adapted to meter flow on the primary flow path;

a primary electrohydraulic servo valve configured to control a position of a piston of the primary flow metering valve;

a secondary flow metering valve configured and adapted to meter flow on the secondary flow path; and a secondary electrohydraulic servo valve configured to control a position of a piston of the secondary flow metering valve;

a supply line fluidically connected to the primary electrohydraulic servo valve and to the secondary electrohydraulic servo valve, wherein the supply line is fluidically connected to the flow path upstream from a split between the primary flow path and the secondary flow path; and a servo pressure regulating valve in the supply line, and wherein the flow path is free from valve or metering devices between the servo pressure regulating valve and the split.

2. The system as recited in claim 1, further comprising a primary linear variable differential transformer (LVDT) operatively connected to the primary flow metering valve.

3. The system as recited in claim 2, further comprising a primary electro-hydraulic servo valve (EHSV) in fluid communication with the primary flow metering valve, wherein the primary EHSV is configured and adapted to control a position of a piston of the primary flow metering valve.

4. The system as recited in claim 1, further comprising a secondary LVDT operatively connected to the secondary flow metering valve.

5. The system as recited in claim 4, further comprising a secondary EHSV in fluid communication with the secondary flow metering valve, wherein the secondary EHSV is configured and adapted to control a position of a piston of the secondary flow metering valve.

6. The system as recited in claim 1, a primary pressure regulating valve in fluid communication with the primary flow metering valve, wherein the primary pressure regulating valve is configured and adapted to throttle excess pressure between an inlet of the primary flow metering valve and an outlet of the primary flow metering valve in order to maintain a known delta pressure.

7. The system as recited in claim 1, a secondary pressure regulating valve in fluid communication with the secondary flow metering valve, wherein the secondary pressure regulating valve is configured and adapted to throttle excess pressure between an inlet of the secondary flow metering valve and an outlet of the secondary flow metering valve in order to maintain a known delta pressure.

8. The system as recited in claim 1, further comprising a bypass pressure regulating valve (BPRV) in fluid communication with the primary flow metering valve, wherein the BPRV is configured and adapted to maintain a metering window delta pressure by bypassing any excess flow provided.

9. The system as recited in claim 1, wherein the fuel outlet includes a primary fuel outlet in fluid communication with the primary flow path and a secondary fuel outlet in fluid communication with the secondary flow path.

10. An engine fuel control system comprising:

a pump;

a dual valve fuel metering system downstream from the pump, wherein the dual valve fuel metering system includes:

a flow path defined between a fuel inlet and a fuel outlet, wherein the flow path includes a primary flow path and a secondary flow path, wherein the fuel outlet is configured and adapted to be in fluid communication with at least one engine fuel manifold;

a primary flow metering valve configured and adapted to meter flow on the primary flow path;

a primary electrohydraulic servo valve configured to control a position of a piston of the primary flow metering valve;

a secondary flow metering valve configured and adapted to meter flow on the secondary flow path;

a secondary electrohydraulic servo valve configured to control a position of a piston of the secondary flow metering valve;

a supply line fluidically connected to the primary electrohydraulic servo valve and to the secondary electrohydraulic servo valve, wherein the supply line is fluidically connected to the flow path upstream from a split between the primary flow path and the secondary flow path; and a servo pressure regulating valve in the supply line;

an engine downstream from the dual valve fuel metering system; and an engine computer operatively coupled to the dual valve fuel metering system to control the dual valve fuel metering system.

11. The system as recited in claim 10, wherein the pump is a positive displacement pump.

12. The system as recited in claim 10, wherein in the pump is a pressure-setting pump.

13. The system as recited in claim 10, wherein the dual valve fuel metering system includes a primary LVDT operatively connected to the primary flow metering valve and a secondary LVDT operatively connected to the secondary flow metering valve.

14. The system as recited in claim 13, wherein the engine computer is in electrical communication with the primary LVDT to receive a position measurement of a piston of the primary flow metering valve from the primary LVDT.

15. The system as recited in claim 13, wherein the engine computer is in electrical communication with the secondary LVDT to receive a position measurement of a piston of the secondary flow metering valve from the secondary LVDT.

16. The system as recited in claim 10, wherein the dual valve fuel metering system includes a primary EHSV in communication with the engine computer and in fluid communication with the primary flow metering valve, wherein the primary EHSV is configured and adapted to receive a command from the engine computer and control a position of a piston of the primary flow metering valve.

17. The system as recited in claim 10, wherein the dual valve fuel metering system includes a secondary EHSV in communication with the engine computer and in fluid communication with the secondary flow metering valve, wherein the secondary EHSV is configured and adapted to receive a command from the engine computer and control a position of a piston of the secondary flow metering valve.

* * * * *